W. B. SEWARD.
Sorghum Skimmer.
No. 59,665.
Patented Nov. 13, 1866.
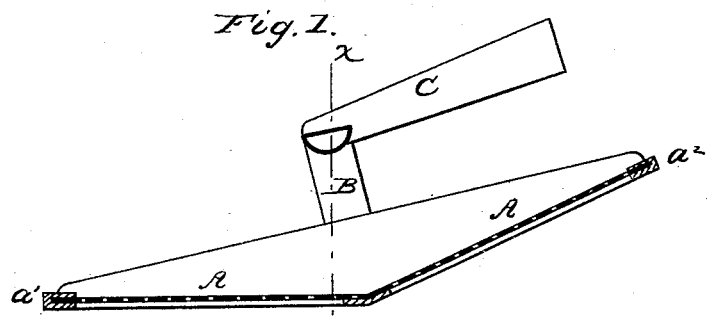
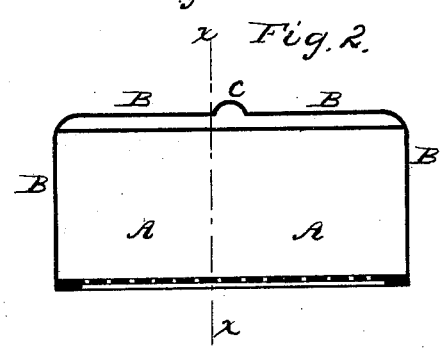
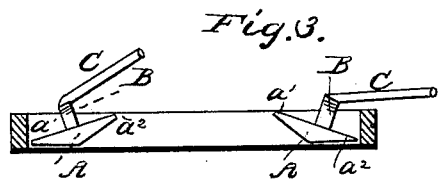
Witnesses:
Theo Tusch,
J. A. Service,
Inventor:
W B Seward
Per Munn
Attorney

UNITED STATES PATENT OFFICE.

W. B. SEWARD, OF BLOOMINGTON, INDIANA.

IMPROVED SORGHUM-SKIMMER.

Specification forming part of Letters Patent No. 59,665, dated November 13, 1866.

*To all whom it may concern:*

Be it known that I, W. B. SEWARD, of Bloomington, in the county of Monroe and State of Indiana, have invented a new and useful Improvement in Sorghum-Skimmers; and I do hereby declare that the following is a full, clear, and exact description thereof, which will enable others skilled in the art to make and use the same, reference being had to the accompanying drawings, forming a part of this specification, in which—

Figure 1 is a vertical longitudinal section of my improved skimmer, taken through the line $x\ x$, Fig. 2. Fig. 2 is a vertical cross-section of the same, taken through the line $y\ y$, Fig. 1. Fig. 3 is a view illustrating the manner in which my improved skimmer operates in skimming a pan. Fig. 4 is a view illustrating the manner in which the ordinary skimmers operate in skimming a pan.

Similar letters of reference indicate like parts.

Sorghum-juice is usually evaporated in pans having light iron bottoms and wooden sides. By the process of evaporation the scum is thrown against the sides of the pan, whence it is removed with a skimmer. With an ordinary skimmer the scum is readily removed from the side of the pan farthest from the operator; but in skimming the side of the pan nearest to him more difficulty is encountered. In this case the skimmer has to be reversed, and the operator has to expose his arm and face to the hot steam rising from the pan, performing the operation in haste and pain, and consequently performing it imperfectly.

My invention has for its object to furnish an improved skimmer, by the use of which this inconvenience may be obviated, and the operator be able to skim both sides of the pan with equal facility; and it consists of a skimmer open at both ends, so as to permit either end to be used to lift or remove the scum.

A is the skimmer, which may be made of any suitable material. Both ends, $a^1$ and $a^2$, are left open, as shown in Fig. 1, so that either end may be used for removing the scum.

B is a rigid bail or strap, the ends of which are attached to the central parts of the sides of the skimmer, as shown in Figs. 1 and 3. To this bail is attached the end of the handle, or the socket C, in which the end of the handle is to be inserted. This handle or socket must be attached to the bail B at such an angle as will make it convenient to use either end of the skimmer in skimming.

When the evaporating-pan is made with partitions or ledges dividing it into a number of compartments, the skimmer A should be made a little narrower than the width of said compartments, so that an entire compartment may be skimmed by passing the skimmer once forward to skim the farther side of the pan, and once backward to skim the nearer side of said pan.

The precise shape of the skimmer is immaterial so long as it is open at both ends, $a^1$ and $a^2$, so that it may be used to skim both sides of a pan without being reversed.

I claim as new and desire to secure by Letters Patent—

An improved skimmer, A, open at both ends, $a^1$ and $a^2$, so as to operate when moving back and forth, substantially as herein shown and described, and for the purpose set forth.

W. B. SEWARD.

Witnesses:
F. T. BUTLER,
JESSE W. EAST.